Oct. 21, 1969  E. HENRY-BIABAUD  3,473,621
STEERABLE FRONT-WHEEL-DRIVE VEHICLES
Filed June 13, 1967
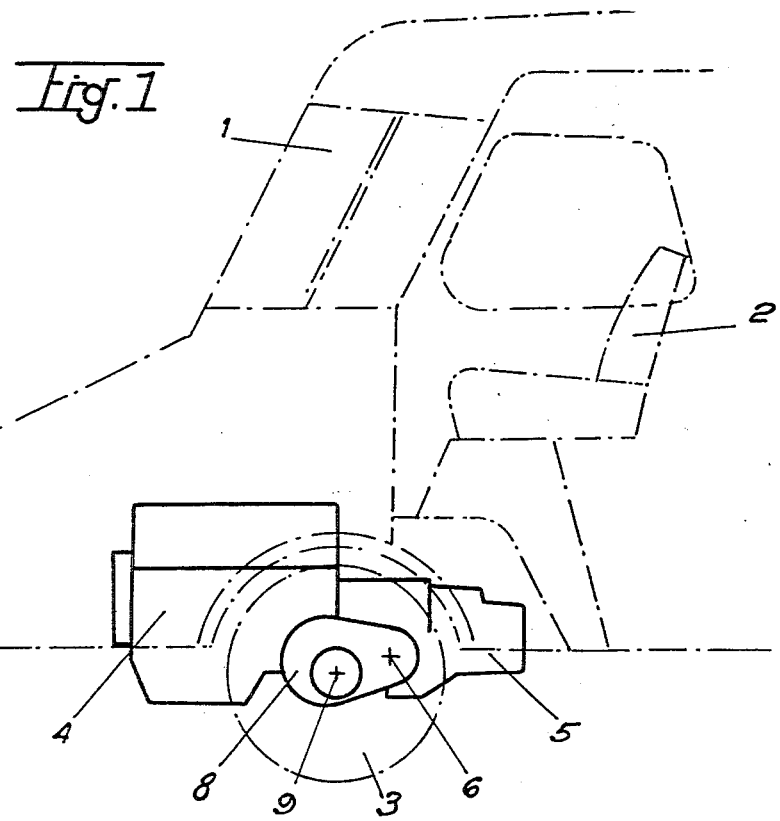
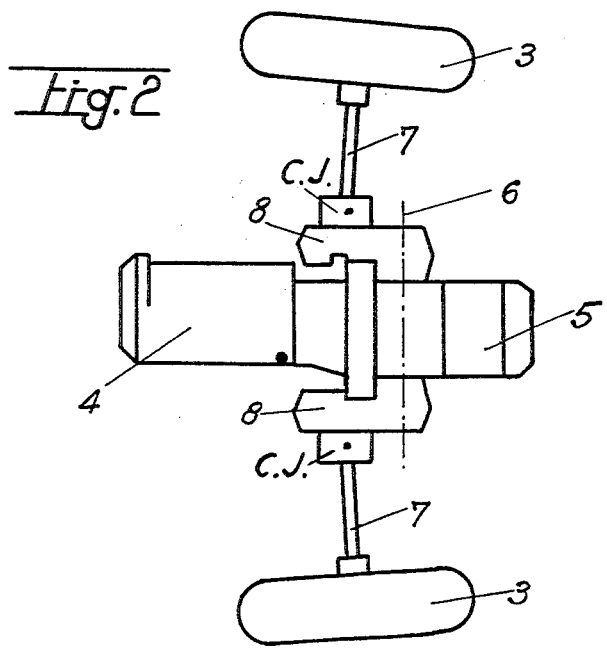
EDMOND HENRY-BIABAUD
INVENTOR
Karl G. Ross
Attorney

United States Patent Office 3,473,621
Patented Oct. 21, 1969

3,473,621
STEERABLE FRONT-WHEEL-DRIVE VEHICLES
Edmond Henry-Biabaud, Paris, France, assignor to Societe Anonyme Andre Citroen, Paris, France, a corporation of France
Filed June 13, 1967, Ser. No. 645,684
Claims priority, application France, June 21, 1966, 3,293
Int. Cl. B62d 9/00
U.S. Cl. 180—42    1 Claim

ABSTRACT OF THE DISCLOSURE

A front-wheel-drive vehicle including an engine rigid with a combined change-speed gear box and differential, the output of the differential being transmitted to the front road wheels of the vehicle through a speed reduction gear. The configuration of the engine and gear-box assembly reduces the overhang of the engine beyond the front wheels of the vehicle.

---

The present invention relates to an improvement in powered vehicles with front-wheel drive.

In a front-wheel-drive vehicle, the engine assembly includes, in general, an engine behind which is placed an assembly including the differential and the change-speed gear-box.

Now, the position of the drive axle is influenced by that of the gear box and the center of gravity of the engine assembly lies for this reason forwardly of the drive axle so that the assembly everhangs the axle.

According to the present invention there is provided an engine assembly for a front-wheel-drive vehicle, comprising a speed-reducing gear interposed between each transmission shaft and the output shaft of the change-speed gear box, the output shaft of each speed-reducing gear being offset longitudinally from the output shaft of the gear-box.

The output shaft of the speed-reducing gear may be at a lower level than the output shaft of the differential, which reduces the transverse inclination of the transmission shafts. The cost of the engine assembly is reduced, in spite of the presence of two supplementary speed-reducing gears, since the change-speed gear box needs lower transmission ratios. Finally, the conditions of use, servicing and access to the cabin (in the case of any utility vehicle) are more favorable.

An embodiment of a utility vehicle with front-wheel drive in accordance with the invention will now be described, by way of example, with reference to the accompanying diagrammatic drawing, in which;

FIG. 1 is a fragmentary elevational view of the vehicle; and

FIG. 2 is a plan view of the engine assembly.

As shown in the drawing, the vehicle includes the vehicle cab or body 1, a seat 2, and front driving and direction-changing wheels 3.

The vehicle further comprises an engine assembly which includes, to the front, an engine 4 and, to the rear, a gear box 5 incorporating a differential.

The coaxial output shafts of the gear box or transmission 5, the axis of which is indicated at 6, are connected to respective drive axles or transmission shafts 7 for the steerable wheels 3 through a speed-reducing gear train 8. The output shaft 9 of each speed reducer gear 8, which is connected by a universal or Cardan joint (e.g. is represented at C.J.) to the corresponding shaft 7 or wheel axle, lies forwardly of the axis (see FIG. 1) 6 at a level lower than that of this axis.

It can be seen from the drawing that, owing to the provision of the step-down transmissions 8, the engine 4 and the gear box 5 are disposed rearwardly in relation to the position which they would otherwise occupy, which reduces the forward overhang and facilitates the access to the cabin of the vehicle 1.

Also, since the axle 7 of each steerable wheel 3 extends axially inwardly beyond the innermost plane of the respective wheel (i.e. the plane confronting the assembly 4, 5 in FIG. 2) so that the universal joint C.J. engages the remote end of that axle at a considerable distance from the wheel, the latter is free to move both horizontally and vertically with reference to the output shafts 9.

I claim:

1. In a front-wheel-drive vehicle having a front-wheel assembly with a pair of stearable driving wheels on opposite sides of the vehicle and respective transmission axles extending axially inwardly beyond the innermost planes of said wheels, and an engine assembly including an engine forwardly of said axles, a speed-changing gear box coupled with said engine and located rearwardly thereof and a differential inserted between said engine and said gear box and coupled therewith while having a pair of coaxial shafts extending laterally therefrom toward opposite sides of the vehicle, said engine, said gear box and said differential lying substantially at the same level with reference to the road surface engageable by said wheels, the improvement which comprises respective speed-reducing gear means disposed on each side of said differential and connected with the respective output shaft thereof, said speed-reducing gear means each having an output shaft located forwardly of said coaxial shafts and below the level of the axis thereof, and a respective universal joint coupling each of said output shafts with an end of the respective transmission axle remote from the corresponding wheel whereby the latter can move both horizontally and vertically with reference to said output shafts.

References Cited

UNITED STATES PATENTS 1,769,038   7/1930   Ronning et al. _____ 180—42 X

FOREIGN PATENTS 439,409   6/1912   France.

A. HARRY LEVY, Primary Examiner